No. 661,788. Patented Nov. 13, 1900.
C. D. BROOKE.
FISHING FLY.
(Application filed Oct. 4, 1897. Renewed Apr. 3, 1900.)
(No Model.)
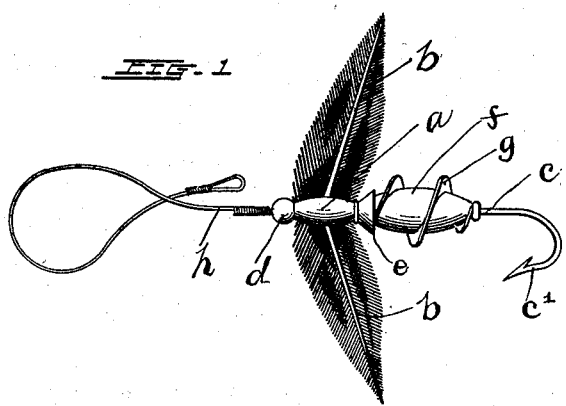
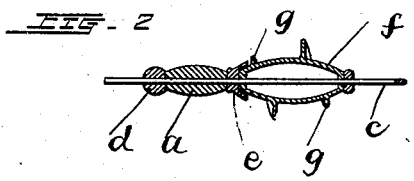
WITNESSES:
J. H. Fravel
A. L. Phelps
INVENTOR
Charles D. Brooke
BY
C. C. Shepherd
ATTORNEY

UNITED STATES PATENT OFFICE.

CHARLES D. BROOKE, OF COSHOCTON, OHIO.

FISHING-FLY.

SPECIFICATION forming part of Letters Patent No. 661,788, dated November 13, 1900.

Application filed October 4, 1897. Renewed April 3, 1900. Serial No. 11,352. (No model.)

*To all whom it may concern:*

Be it known that I, CHARLES D. BROOKE, a citizen of the United States, residing at Coshocton, in the county of Coshocton and State of Ohio, have invented a certain new and useful Improvement in Fishing-Flies, of which the following is a specification.

My invention relates to the improvement of fishing-flies; and the objects of my invention are to provide an improved device of this character of such construction and arrangement as to impart to the fly a life-like appearance when in the water, to combine said fly with a spinner attachment by means of which a natural movement and fluttering action of the wings of the insect is imparted when the same is drawn through the water, and to produce other improvements in details of construction and arrangement of parts, which will be more fully pointed out hereinafter. These objects I accomplish in the manner illustrated in the accompanying drawings, in which—

Figure 1 is a view in elevation of my improved fishing-fly, and Fig. 2 is a central longitudinal section thereof.

Similar letters refer to similar parts throughout both views.

$a$ represents the body of the fly, which may be of any desirable, but preferably elongated, form and which is provided on opposite sides with outwardly-extending wings $b$. Extending through this body is the shank of a hook $c$, and upon this hook-shank is also mounted at one end of the body $a$ a suitable bead or fly-head $d$. Mounted on the hook-shank at the rear end of the body $a$ is a collar or guard $e$, which is preferably of the cup form shown and flares outwardly.

$f$ represents a spinner-body which in the manner hereinafter described operates as a motor to impart the desired motion or movements to the fly body and wings. This spinner-body, which is of an ellipsoidal form, is provided with an exterior spiral flange $g$, which encircles said body one or more times and which extends from end to end thereof. The body $f$ has its inner end extending within the mouth of the guard $e$ and is adapted to rotate upon the hook-shank. The hook $c$ is provided on its outer end with the usual fish-engaging barb $c'$, while the shank of said hook has secured thereto at its outer end a desirable form of snood or snell $h$.

It is evident that in the construction of the above-described fly I may impart any suitable color or colors to the various parts of the fly-body, wings, or spinner-flange, employing such colors and combinations thereof as are best adapted to impart a life-like appearance to the fly and to attract a fish. It is evident that the spinner-body may have attached thereto, if desired, other hooks or clusters thereof. In operation the frictional contact with the water, when my device is drawn therethrough, with the spiral flange of the spinner-body must result, as will readily be seen, in the rapid spinning or rotation of the spinner-body and in imparting to the fly-body and its wings an exceedingly life-like fluttering movement. It is obvious that a fly of the character herein described may be produced in various sizes and will be of great utility in fishing for salmon, bass, trout, and other fish.

Although the shank of the hook is shown and described herein as passing through the spinner and fly body, it is obvious that suitable wire cord or snood continuation might be made to connect said parts and that the hook might be connected directly with the fly or spinner.

Having now fully described my invention, what I claim, and desire to secure by Letters Patent, is—

1. In a fishing-fly, the combination with a hook and a fly-body carried thereon, said fly-body being provided with laterally-projecting wings, of a spinner-body rotatably journaled on said hook-shank, said spinner-body being of an ellipsoidal form and provided with a spiral flange, substantially as and for the purpose specified.

2. In a fishing-fly the combination with a hook, a fly-body carried thereon, said fly-body being provided with laterally-projecting wings, of a spinner-body rotatably journaled on said hook-shank, said spinner-body being of an ellipsoidal form and provided with a spiral flange extending throughout its length and a substantially cup-shaped guard $e$ interposed between said spinner-body and fly-body, said guard receiving one end of the spinner, substantially as and for the purpose specified.

CHARLES D. BROOKE.

In presence of—
C. C. SHEPHERD,
EDWARD M. TAYLOR.